Patented Dec. 27, 1927.

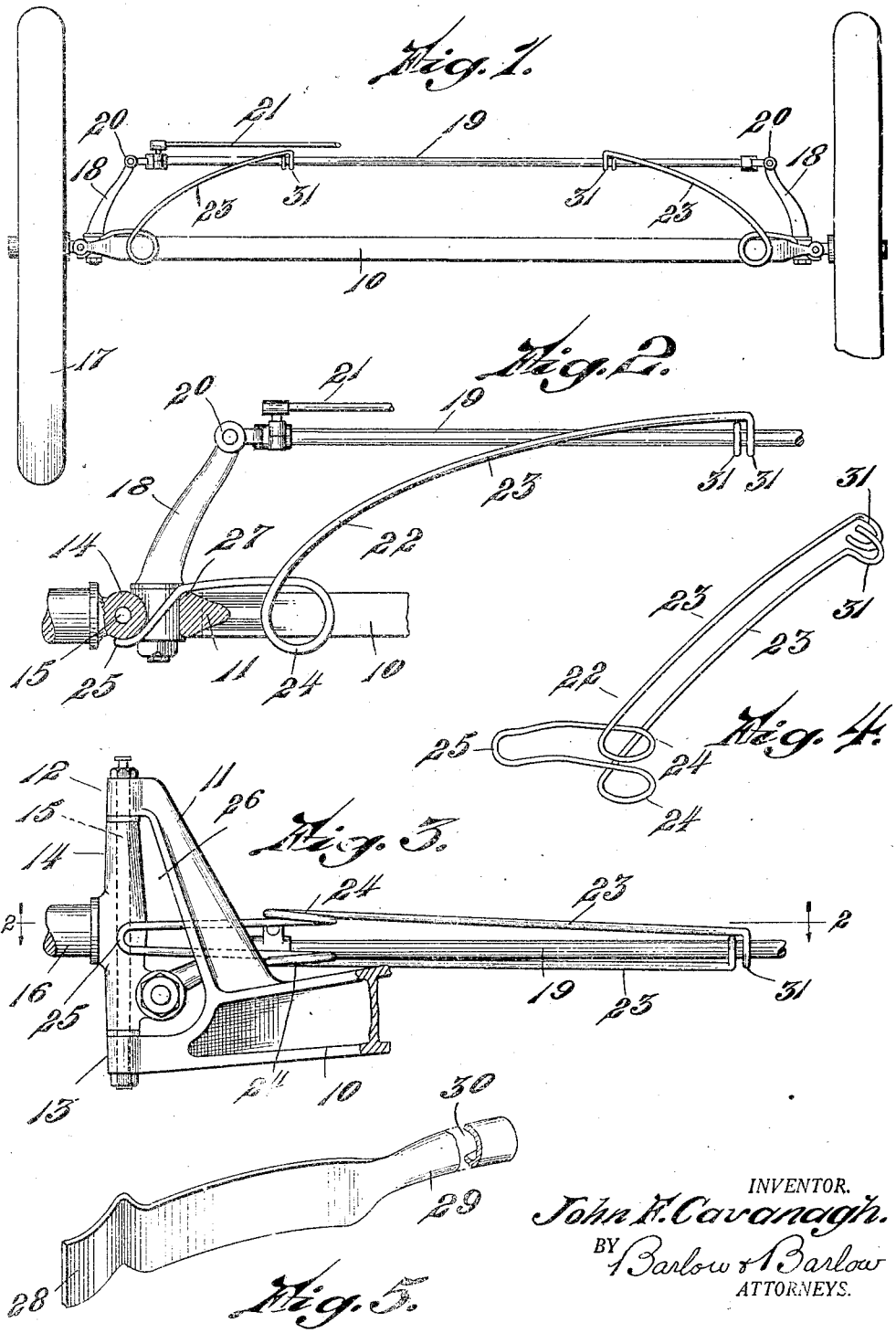

1,653,944

UNITED STATES PATENT OFFICE.

JOHN F. CAVANAGH, OF PROVIDENCE, RHODE ISLAND, ASSIGNOR TO APCO MANUFACTURING COMPANY, OF PROVIDENCE, RHODE ISLAND, A CORPORATION OF RHODE ISLAND.

STEERING STABILIZER FOR AUTOMOBILES.

Application filed November 29, 1926. Serial No. 151,367.

This invention relates to an improved construction of stabilizing device for the steering mechanism of motor vehicles; and the invention has for its object to provide simple and effective means which may be quickly and easily positioned to prevent a wiggling, wabbling or so-called shimmying motion of the forward wheels of the vehicle.

A further object of the invention is to provide a resilient member having one end arranged to apply the desired rearward, flexible tension or pressure directly upon the steering knuckle and its opposite end arranged to engage and press upon the cross rod which connects the knuckle joints, the device at the same time permitting a relative frictional, sliding movement at both of its ends of the parts engaged.

A still further object of the invention is to arrange this resilient wear take-up device to act in the form of a lever fulcrumed on the axle to have one end exert a wear take-up pressure on the joints of the steering knuckle, and its opposite end arranged to snap into engagement with the connecting rod to exert a take-up pressure on the joints of this rod and at the same time permit the rod to slide back and forth under such engaging pressure to prevent rattle in the joints of the knuckles and connecting rod which are the parts which wear the fastest in the steering mechanism.

A still further object of the invention is to provide a device of this character which may be readily snapped into position requiring no fastenings but depending upon its own resiliency under tension to retain it in operating position after having snapped into place.

With these and other objects in view, the invention consists of certain novel features of construction, as will be more fully described, and particularly pointed out in the appended claims.

In the accompanying drawings:

Figure 1 is a top view showing the axle of a motor vehicle, the knuckle joints being pivoted therein and connected by a cross rod and my improved wear take-up device potioned thereon.

Figure 2 is an enlarged view partly in section illustrating my improved wear take-up device arranged to exert at one end a resilient lever action on the joint of the steering knuckles, its other end being arranged to press and slide on the connecting rod.

Figure 3 is an elevation showing a portion of the axle with my improved wear take-up device applied to the knuckle joints and connecting rod.

Figure 4 is a perspective view of my wear take-up device removed and showing the same as formed of wire folded or bent substantially into U-shape with spring loops in each arm.

Figure 5 is a modification showing the wear take-up member as formed of a strip of sheet metal, one end being arranged to engage the steering knuckle while the opposite end is grooved to be snapped into engagement with the connecting rod to press and slide upon the same.

It is found in practice that certain parts of the steering mechanism of automobiles quickly wear and so permit a wabbling motion at the joints, this wear being more particularly noticeable on the king bolts and the hubs of the steering knuckles and also on the joints of the cross rod which connects these steering knuckles together and when these parts become sufficiently worn the vehicle vibrates or wabbles from side to side which is sometimes known as shimmying, which wabbling about is extremely annoying to the driver, serves to wear the tires and also renders driving of the car dangerous particularly when running at a high rate of speed. To obviate this serious difficulty in a simple and effective way, I have arranged to apply pressure first directly upon these steering knuckles by employing a wear take-up lever the shortest end of which is arranged to extend through the axle fork and fulcrum on this fork to engage and exert a rearward pressure on the king bolt hub thereof; and second, the longer end of the lever is arranged to engage and snap over the cross rod to also exert a resilient frictional pressure thereon whereby this connecting rod is permitted to slide back and forth on the lever end, the pressure thereon being sufficient to take up the lost motion in its joints and at the same time to apply sufficient friction on the rod to prevent rattle of the parts and wabbling of the vehicle wheels; and the following is a detailed description of the present embodiment of my invention and showing one arrangement of wear take-up device by which these advantageous results may be accomplished:—

With reference to the drawings, 10 designates the usual vehicle axle, the opposite ends of which are forked as at 11 having an upper bearing 12 and the lower bearing 13 between which is held the king bolt hub 14. This hub is provided with a bore through which the king bolt 15 extends and this hub is provided with a laterally-extending axle portion 16 on which the wheel 17 rotates. This hub is also provided with a rearwardly-extending knuckle arm 18, which arm and knuckle joints on the opposite ends of the axle are joined by a connecting cross rod 19 which is pivoted at 20 to the free end of each of these arms, the steering action being communicated to this cross rod through the steering rod 21 which is connected to the other parts of the steering mechanism (not shown).

It is found in practice that one of the principal causes of the rattling, vibrating or wabbling of the steering parts of the automobile are due to wear of the king bolt and its bearings in the king bolt hub of this steering knuckle; and that this action is further caused by wear at the joints 20 where the cross rod is connected to the knuckle, and to obviate this difficulty and take up the wear on both this steering knuckle and this rod simultaneously, I have provided a resilient lever 22 which is arranged to exert pressure on both of these parts in a rearward direction. One form of this lever is best shown in Figure 4, which is shown as being constructed of wire bent into substantially U-form, each arm 23 of which is provided with a coil or loop 24 intermediate its ends, the extremity of the longer end of the lever arm being folded or bent into hook form as at 31 which hooks are of a size to loosely fit over the connecting rod 19 and permit this rod to frictionally slide endways therein.

In positioning this lever, the bridge portion 25 thereof is set to extend from the rear through the opening 26 in the fork of the axle to frictionally engage the forward side of the steering knuckle hub and is arranged to be fulcrumed at the point 27 on the fork of the axle. The loop portions 24 of the lever arms being positioned over the axle to engage the inclined rib of the fork to prevent an endways movement thereof and the long arm portion 23 of this lever is then sprung down under tension and its hook-shaped end portions 31 snapped over the connecting rod 19 from which arrangement it will be seen that the shorter arm of the lever is caused to exert the greatest frictional pressure rearwardly and directly upon the steering knuckle hub and the longer arm to more yieldably engage the connecting rod to exert the necessary pressure thereon to take up the wear at its pivot joints 21 and also to effect a steering friction on this rod to further resist a vibration and rattle of the parts at certain speed of the engine.

By the use of my improved resilient wear take-up device it will be seen that I exert the greatest pressure where the greatest pressure is needed: viz—on the steering knuckle, and that this pressure is in a rearward direction in line with the direction of the pressure or thrust and the greatest wear when the car is being driven ahead thus holding this knuckle in its natural position against lost motion and vibration and at the same time I exert a yielding frictional pressure on the connecting rod where such light pressure only is required, but in some instances instead of forming the lever of wire I may employ a strip of metal as best illustrated in Figure 5, in which the end 28 is hooked around in front of the king bolt hub 14, the same being fulcrumed at the point 27 on the axle and the free end 29 of this lever is grooved as at 30 to snap over the connecting rod 19, the tension of which holds the device in position by its own resilient tension without bolts or other fastenings.

It will be noted in both of my improved constructions that no fastening means is used, and that the device is so shaped as to fit into position and engage the parts and be snapped into position where it is held by the inherent resiliency of the stock of the device without other fastening means.

It is also found that in certain new automobiles that there is a certain period of vibration of the engine and the body which causes the steering wheel of the vehicle to vibrate, wabble or "shimmy" and that by the use of this construction this vibration of the steering wheel may be entirely eliminated which is due to a large extent from the friction between the ends 25 and 31 of my device and the parts with which they engage.

My improved device is very simple and attractive in construction, is effective in its operation and by its use the rattle and vibration and also the wabbling and shimmying of the wheels is effectually prevented.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a vehicle, an axle forked at its ends, steering knuckles pivoted in said forked ends, a rearwardly-extending arm on each of said knuckles, a connecting cross rod pivoted at each end to said knuckle arms, and a resilient wear take-up tension member having one end arranged to extend thru said fork to engage and exert a lateral prying action on said knuckle, the opposite end of said member while under tension being positioned to slidably engage said connecting rod to apply tension to its pivot joints and also exert a frictional pressure on the rod to resist a free endways movement thereof.

2. In a vehicle, an axle forked at its end, steering knuckles pivoted in the forked ends of the axle, a rearwardly extending arm on each knuckle, a cross rod spaced from the axle and pivotally connected at each end to said knuckle arms and a resilient lever having a body portion with one end shaped to extend thru said fork and engage the forward side of said knuckle to exert a rearward prying action thereon and fulcrumed adjacent said end on said axle, the opposite end of said lever frictionally engaging said connecting rod to slide therein under pressure to take up wear on the joints at both of its ends and also resist a free endways movement of said rod.

3. In a vehicle, an axle, steering knuckles pivoted to said axle, a rearwardly-extending arm on each knuckle, a cross rod pivotally connected at each end of said knuckle arms and a resilient lever member formed of folded wire fulcrumed adjacent one of its ends on the axle to exert a wear take-up prying pressure on said knuckle joint, the opposite long end of the lever being folded into loop form to engage said cross rod and exert pressure thereon to take up wear of its joints and also exert an effective frictional action to resist the free sliding movement of the cross rod thru said end loops.

In testimony whereof I affix my signature.

JOHN F. CAVANAGH.